United States Patent [19]

Haaker et al.

[11] Patent Number: 4,888,794

[45] Date of Patent: Dec. 19, 1989

[54] METHOD OF GENERATING AN IMAGE OF A LAYER OF AN OBJECT

[75] Inventors: Paul R. Haaker, Hamburg; Erhard P. A. Klotz, Halstenbek; Reiner H. Koppe, Hamburg; Rolf E. Linde, Haseldorf, all of Fed. Rep. of Germany

[73] Assignee: U.S. Philips Corporation, New York, N.Y.

[21] Appl. No.: 173,684

[22] Filed: Mar. 24, 1988

[30] Foreign Application Priority Data

Mar. 26, 1987 [DE] Fed. Rep. of Germany ....... 3710011

[51] Int. Cl.⁴ .................................. G03C 9/00
[52] U.S. Cl. ............................. 378/41; 378/42; 378/62; 378/99; 358/111
[58] Field of Search ................ 378/41, 42, 4, 10, 21, 378/62, 99; 358/111

[56] References Cited

FOREIGN PATENT DOCUMENTS 3442448 5/1986 Fed. Rep. of Germany .......... 378/4
0634152 3/1950 United Kingdom .................. 378/62

OTHER PUBLICATIONS

P. Haaker et al., A New Digital Tomosynthesis Method With Less Artifacts For Angiography-Medical Physics, vol. 12, No. 4, Jul./Aug. 1985, pp. 431–416.

Primary Examiner—Carolyn E. Fields
Assistant Examiner—David P. Porta
Attorney, Agent, or Firm—Thomas A. Briody; Jack E. Haken; Jack D. Slobod

[57] ABSTRACT

The invention relates to a method which enables spatial display in cases where X-ray images are formed from different perspectives which are situated far apart. To this end, from the single images a synthetic image of the examination zone is calculated for at least one position which neighbors one of the radiation source positions, which synthetic image is used for imaging the examination zone.

21 Claims, 3 Drawing Sheets

METHOD OF GENERATING AN IMAGE OF A LAYER OF AN OBJECT

BACKGROUND OF THE INVENTION

The invention relates to a method of generating an image of a layer of an object, in which an examination zone is irradiated from a plurality of penetrating radiation source positions in order to generate separate single images, for each single image there being stored digital measurement values which are dependent on the absorption in its image points, for a layer image point of a layer in the examination zone there being derived, from the stored measurement values of the image points geometrically associated with the layer image point, an image value which corresponds to the absorption at the relevant point. The invention also relates to a device for performing this method.

A method of the kind set forth is known from German Patent Application p 32 37 572 corresponding to U.S. Pat. No. 4,630,296, and also from the magazine "Medical Physics", Vol. 12. No. 4, July/August 1985, pages 431 to 436. This method is suitable for forming X-ray layer images of so-called dilute objects, that is to say objects exhibiting a comparatively low X-ray absorption in most volume elements and a high absorption in few volume elements only. A preferred field of application is the imaging of arteries of the coronary vascular system which are filled with a contrast medium. For such objects, for example, the arteries of the coronary vascular system of a patient which are filled with a contrast medium, the known method produces substantially artefact-free layer images from only a few single images, in other words only a few radiation sources are required (for example, four).

For such examinations a spatial impression of the examination zone is often desirable. Such a spatial impression can be obtained, for example by simultaneously displaying two X-ray images formed from spatially neighbouring positions (stereo basis) so that each time one image is observed by one eye, or by consecutively displaying images formed from neighbouring positions so that the object as seen by the observer is "rotated". A combination of both methods is also possible.

This kind of spatial display, necessitates the availability of X-ray images formed from spatially neighbouring positions. This condition is not satisfied by the method described above, because it involves only the formation of a few images from perspectives which substantially deviate from one another, so that an observer cannot integrate two single images into a single stereo image.

SUMMARY OF THE INVENTION

It is an object of the present invention to develop a method of the kind set forth so that it enables spatial display, and also to provide a suitable device.

This object is achieved in that for at least one position which neighbours one of the actual radiation source positions there is calculated a synthetic image of the examination zone or a part thereof by deriving, from the image values of those layer image points which are situated on a straight line between the position and an image point of the synthetic single image, each time an image value for the relevant image point, the synthetic image thus formed being used for the spatial display of the examination zone.

The invention utilizes the fact that for a method of the kind set forth data concerning the absorption distribution in the three-dimensional examination zone are available per se, because images of the absorption distribution in different layers of the object (socalled layer images) can be calculated from the single images. Therefore, it is in principle possible to form a synthetic image of the examination zone from a perspective not involved in the formation of the single images, the perspective of said synthetic image neighbouring the perspective of one of the single images. The synthetic image and the single image formed from a neighbouring perspective can then be observed as a stereo image pair. The (single and synthetic) images formed from neighbouring perspectives can then be subjected to the previously described display method which offers the user a spatial impression of the examination zone.

The synthetic image need not represent the entire examination zone; a part which involves a number of layer of the examination zone already suffices. Only this part can then be stereoscopically observed.

The synthetic images can be formed in that first images of all layers of the examination zone are reconstructed and synthetic images are formed therefrom, the image value for an image point in the synthetic images being derived from the image values of all layer image points which are projected onto the image point from the associated position. A method of this kind would require a high storage capacity because, in addition to the memories required for the single images and for at least one synthetic image, there would also be required memories for all layers.

In a further version in accordance with the invention, this storage capacity can be reduced in that, after each determination of the image value of a layer image point, this image value is used for calculating the image value of the image point in the synthetic image with which the layer image point is geometrically associated, the image value for a further layer image point being determined only after that. Because the image value of a layer image point is used for deriving the image value of an image point in the synthetic image immediately after it has been reconstructed (from measurement values of the single images), it need not be stored; according to this version of the method, therefore, memories are required only for the single images and for the synthetic images.

For the exact determination of the image value of an image point it is usually necessary to interpolate between the image values of neighbouring image points within a layer. This calculation effort can be avoided in a further version of the invention in that each position for the calculation of a synthetic image is situated on the connecting line between two radiation source positions at the distance $D/m$ from one of these radiation source positions, where m is an integer larger than 1 and D is the distance between two radiation source positions, for the extraction of image values for the synthetic image there being used image values of layer image points which are situated in layer planes in which the connecting lines between the radiation source positions and the image points of the associated single images and the connecting lines between the image points of the synthetic image and the radiation source position associated with this image intersect.

This version is based on the recognition of the fact that, in the case of a suitable position of the image points in the synthetic image, the layer image points are projected from the (radiation source) positions onto the image points of the single images or the synthetic images. Therefore, without interpolation it is possible to derive the image values for the layer image points from the measurement values of the image points in the single images and to derive therefrom the image values for the image points of the synthetic image. This substantial reduction as regards calculation effort, however, involves a given reduction of information because for the reconstruction of the synthetic image information is used only from every $m^{th}$ layer. In practice, however, it has been found that the synthetic image still contains adequate information for providing a spatial impression in conjunction with the single image formed from a neighbouring radiation source position when $m=10$, i.e. when only every tenth layer is used for the reconstruction of the synthetic image. The factor m determines the distance between the position for a synthetic image and a neighbouring single image and hence the stereo basis. Therefore, the stereo basis can be adapted to individual requirements by variation of m.

In a further version of the invention, the position of layer image points in the single images and in the synthetic image (images) which can be predetermined by the operator is calculated and marked in these images upon display. As a result, the position of a region of the examination zone which is important for diagnosis can be marked, for example, by means of a cursor and the coordinates of the marked layer image point can be indicated in a cartesian coordinate system. It is attractive to display a plurality of stereo image pairs, each time with the marked points, simultaneously on a display device so that the positioning of the cursor can be accurately checked from different perspectives.

In another version, the distance between two layer image points predetermined by the user is calculated and indicated. As a result, accurate measurements can be performed within the examination zone on the basis of the stereo images.

A device for performing the method in accordance with the invention is characterized in that it comprises a plurality of X-ray sources which are arranged in one plane in order to irradiate an examination zone, an image pick-up device for recording the spatially separate single images of the examination zone which are generated by the radiation sources, means for digitizing the measurement values corresponding to the absorption in the image points of the single image, a first storage device for storing the measurement values, means for determining the image values of layer image points, a second storage device for storing the image values of at least one synthetic image, means for deriving each time one image value for an image point of the synthetic image from the image value of a layer image point, and a display unit which can be coupled to the storage devices.

BRIEF DESCRIPTION OF THE DRAWING

The invention will be described in detail hereinafter with reference to the drawings. Therein.

DESCRIPTION OF THE PREFERRED EMBODIMENT

Figure 1:
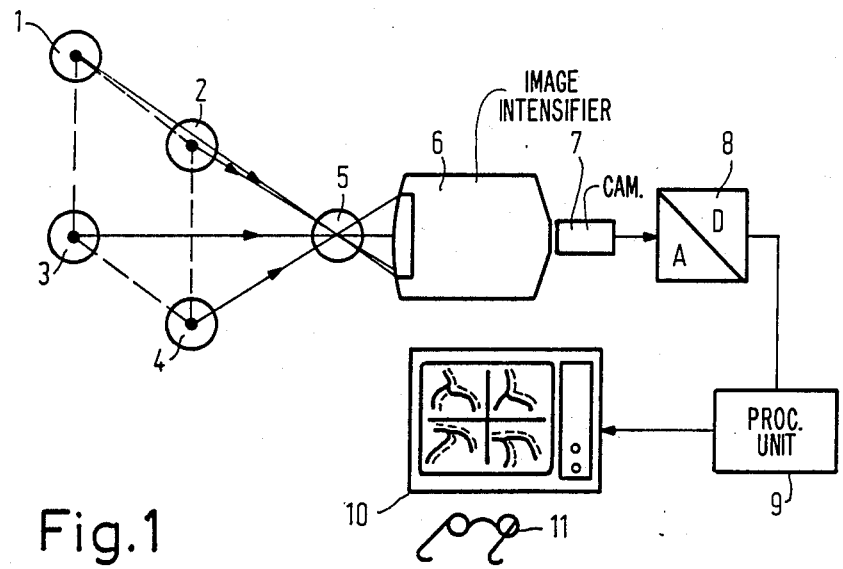
FIG. 1 shows disgrammatically a device for performing the method.

In FIG. 1 four X-ray sources 1, 2, 3 and 4 are arranged at the corners of a square in order to irradiate an object 5 to be examined. Thus, four spatially separate single images are formed on the entrance screen of an image intensifier 6. The image on the exit screen of the image intensifier 6 is converted into an electric signal by a video camera 7, which signal is converted into a series of digital data words by an analog-to-digital converted 8. In an image processing unit 9 four stereo image pairs are derived from said digital data words, said stereo image pairs being displayed on a monitor 10 so that a spatial impression of the object 5 is obtained when these image pairs are observed by means of stereo spectacles 11.

Figure 2:
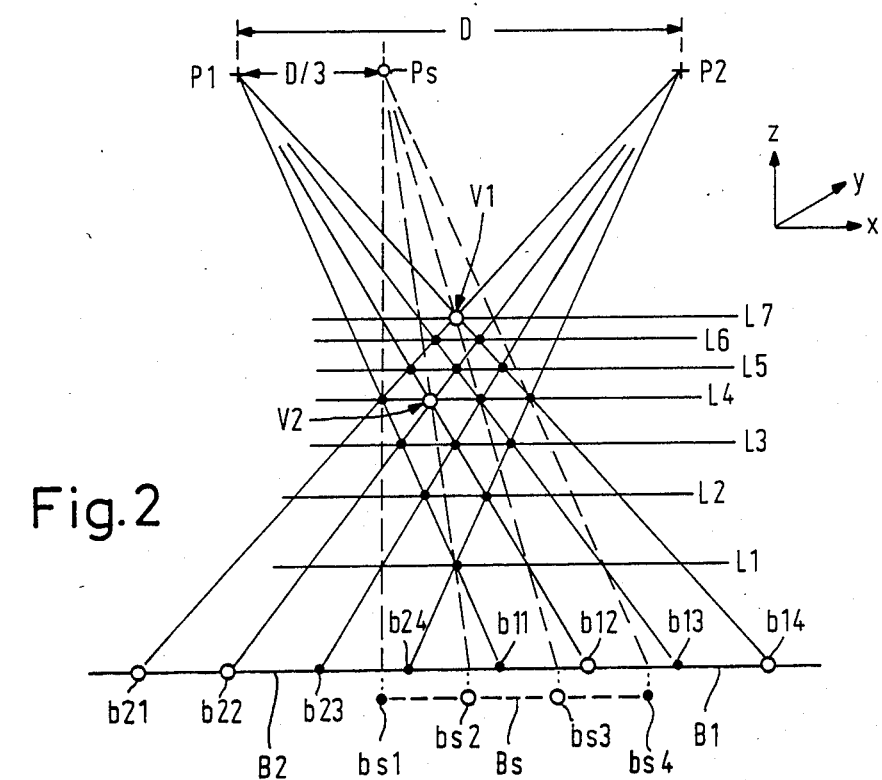
FIG. 2 shows the geometrical relationships in such a device.

The geometrical relations in the device shown in FIG. 1 are illustrated by FIG. 2 which for the sake of simplicity concerns only the two-dimensional case where the planes correspond to straight lines. The X-ray source 1 which is situated in the position P1 forms an image B1 of the object to be examined in the plane of the entrance screen of the image converter system. This image consists of a line of four image points b11, b12, b13, b14 (from left to right). Actually, a line comprises a substantially larger number of image points, for example 256, and an image comprises more than one line, for example also 256. The position and the magnitude of the image points are codetermined by the phase and the frequency of the clock signal for the analog-to-digital converter 8 in relation to the signal of the video camera 7.

Analogously, the radiation source 2 in the position P2 forms an image B2 which consists of the points b21, b22, b23 and b24 (again from left to right).

When the image points (for example, b11 ... b14) are connected to the position of the associated radiation source (P1), two radiation beams are formed whose rays intersect in layers L1 ... L7 which extend parallel to the plane of the radiation sources. Each point of intersection between ray of one radiation beam and a ray of another radiation beam corresponds to a layer image point. The examination zone within which an object can be imaged is limited essentially by the outer rays of the two radiation beams.

It is to be noted that the geometrical terms used above, for example points, rays, straight lines and layers are not be to interpreted in a mathematical sense, but have finite dimensions which deviate from zero; the points and straight lines shown in FIG. 2 represent merely the centres or centre lines thereof.

It appears from the drawing that the two extreme rays of the radiation beams emerging from the positions P1 and P2 intersect in the layer L4. This layer comprises as many image points as the single images. Moreover, there are further layers (L1 ... L3 and L5 ... L7) in which the beams also intersect but which comprise fewer image points than the layer L4. The number of layers depends on the number of image points in a line of a single image; in the case of n image points, there will be $2n-1$ different layers.

In the drawing it is assumed that only the volume elements V1 and V2 in the examination zone have an absorption which deviates from zero. These volume elements are imaged in the points b14 and b12 in the single image B1 and are projected onto the points b21 and b22 in the single image B2. Layer image points present in said layer plane L4 are thus projected onto image points in the single images whose position is the same within the single images; for example, the volume element V2 in the layer L4 is projected onto the image points b12 and b22 in the single images B1 and B2, respectively. However, volume elements which are situated outside the layer L4 are projected onto image points (b14, b21) which occupy different positions within the single images. For layers which are situated nearer to the radiation source positions (for example, the layers L5 ... L7) it holds good that the projection of a layer image point in the layer image B2 generated by the right-hand radiation source P2 is situated one or more image points further to the left than in the single image B1 generated by the left-hand radiation source P1. For the layers L1 ... L3 situated underneath the layer L4 the relations are the same, but in these cases the image is shifted to the right instead of to the left.

This fact simplified the reconstruction of the absorption distribution in the layers L1 ... L7 from the single images B1 ... B2, because this merely requires address operations but no interpolations between the image values of a plurality of image points of a single image.

It is assumed that the distance between the radiation source positions P1 and P2 is D. It can then be demonstrated that for a radiation source position Ps which is situated on the straight line between P1 and P2 at the distance D/m from one of the radiation sources (m being a positive integer), a synthetic image Bs can be calculated, on the image points bs1, bs2, bs3 and bs4 of which the layer image points of each $m^{th}$ layer are projected. The synthetic image can thus be derived from the image values of these layer image points without interpolation.

In the drawing the position Ps is situated between the radiation source positions P1 and P2 at the distance D/3 from the radiation source position P1 and the image Bs is situated so that the connecting lines between the image points bs1 ... bs4 and the position Ps intersect, in one plane (the plane L4), the rays extending from the radiation sources P1, P2 to the image points of the images B1, B2 at the same points. The same takes place every third layer, starting with the layer L4, so also in the layers L1 and L7 in the present example.

In the synthetic image Bs a layer image point in the layer L4 is imaged in the same position as in the single images; for example, the layer image point V2 in the synthetic image is projected onto the image point bs2 and in the single images on the image points b12 and b22, i.e. each time on the second image point from the left. The projection of an image point in the third layer (L7) after the layer L4 is projected in the synthetic image onto an image point which has been shifted one position to the right with respect to the image B1 formed from the neighbouring radiation source position P1; for example, the layer image point V1 in the layer L7 is projected onto the image point bs3 in the image Bs whose position (third from left) in the synthetic image Bs has been shifted through one image point with respect to the position of the image point b14 on which the layer image point V1 is projected in the single image B1.

On the basis of these geometrical relations, the following steps occur for the reconstruction of a synthetic image from the single images:

(a) For a layer, for example L4, first the image value of a layer image point is determined from the single images. To this end, from all single images the image values are taken of the image points on which the relevant layer image point is projected, i.e. the image values for the image points b12, b22 and the geometrically associated image points in the single images of the other radiation sources. From these image values that image value which corresponds to the lowest absorption (see DE-OS No. 32 37 572) or the lowest absorption but one (see German Patent Application No. P 36 32 833.2) corresponding to U.S. patent application Ser. No. 099,569, filed Sept. 22, 1987 is assigned to the layer image point (V2) as the image value.

From the image value calculated in accordance with paragraph a) the image value of the image point (bs2) in the synthetic image Bs is determined on which the layer image point (V2) is projected from the position Ps. To this end, the image value of the layer image point (possibly standardized) can be added to the image value which may already have been stored for this image point. Preferably, however, it is compared with the image value already stored and for the relevant image point that one of the two image values which corresponds to the higher absorption is stored. As a result, the layer image points representing a low absorption, i.e. the undersirable image background, are suppressed.

(c) Repetition of the steps (a) and (b) for all layer image points of the same layer (L4).

(d) Repetition of the steps (a) to (c) for the $m^{th}$ layer after the first layer (L4) etc. until all layer image points situated within the volume defined by the extreme rays have been calculated and processed. If desired, this processing operation may be restricted to a few layers only, so that only a comparatively thick layer of the examination zone can be stereoscopically observed.

It would in principle also be possible to calculate first the image values for the layer points of all layers (or only every $m^{th}$ layer) and to execute subsequently the step b for each image point of the synthetic image. However, this would necessitate the storage of these layer images. The storage of the layer images can be omitted when the above sequence of steps is executed.

Figure 3:
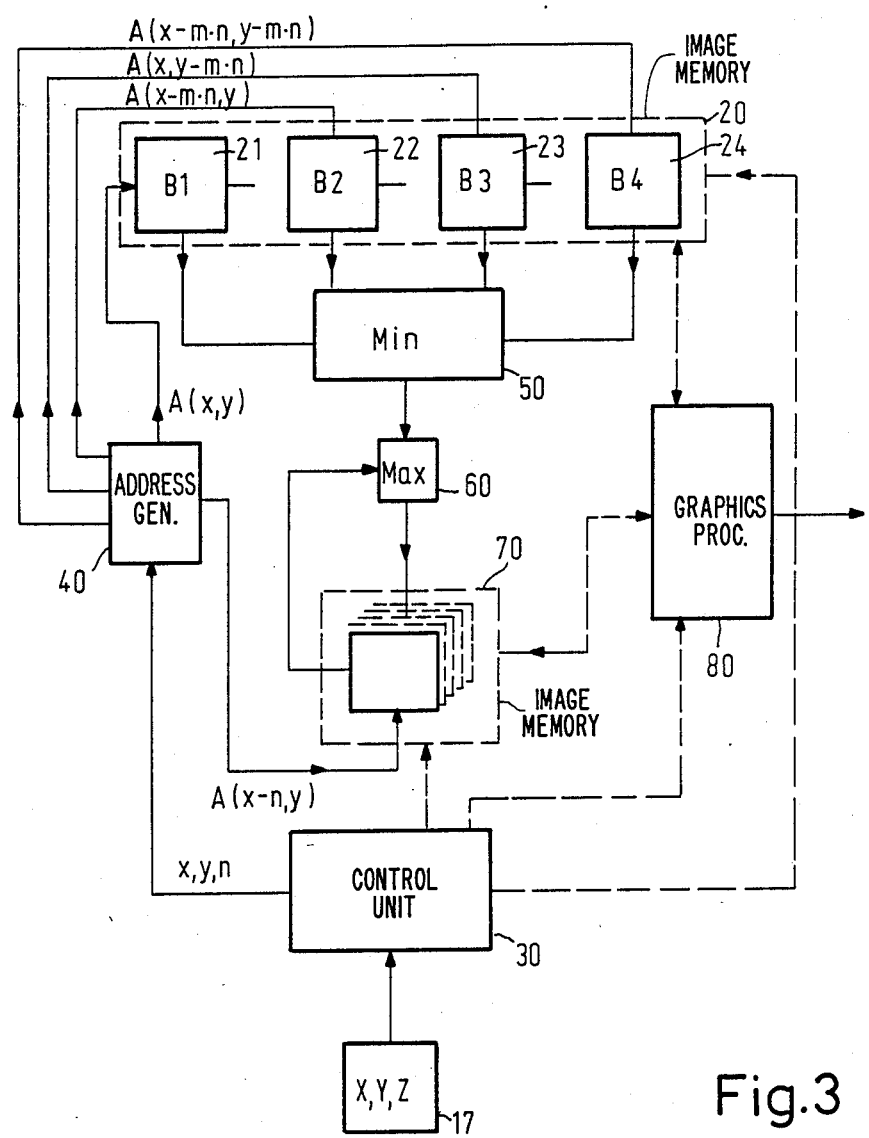
FIG. 3 shows an image processing unit which is suitable for the device shown in FIG. 1.

The described processing steps are executed by the image processing unit 9 whose block diagram is shown in FIG. 3. This unit comprises an image memory 20 which comprises a memory 21, 22, 23, and 24 for each of the single images B1 ... B4 formed by the radiation sources 1 to 4, in which memories there are loaded, using means not shown, image values which correspond to the image values at the individual image points. In this respect it is assumed that in the image memories 21 to 24 the image values for the image points occupying the same position within the single images are stored at the same address. Under the control of a control unit 30, each time one image value is fetched from the memories 21 ... 24. The addresses required for this purpose are generated by an address generator 40 which itself is controlled by the control unit 30. The addresses depend not only on the position x, y of an image point in the single image B1 but also on the distance between the position Ps and the neighbouring radiation source position, as expressed by the number m (for the example shown in FIG. 2, m=3), and also on the position of the layer which is characterized by n. For the layer L4, n=0, so that the addresses A (x, y) for the memories 21 ... 24 are the same.

The four image values read are applied, in the manner known from DE-OS No. 32 37 572, to an extreme value decoder 50, the output of which delivers that one of the four image values applied to its input which corresponds to the lowest absorption. This image value represents the image value of a layer image point (step a))

This image value is applied to an extreme-value decoder 60, the output of which delivers that one of its two input values which corresponds to the highest absorption. The output of the extreme value decoder 60 is connected to an image memory 70 which contains at least one synthetic image. The address of the memory location wherefrom an image value is read and at which the output value of the extreme-value decoder 60 is written is also determined by the address generator 40. The image value read (at the beginning of the processing operation the values of the entire memory have been set to zero) is applied to the second input of the extreme value decoder 60, is compared with the image value of the relevant layer point in the decoder 60, and the image value which corresponds to the highest absorption is stored in the memory 70 (step b)). For the layer characterized by $n=0$, the address of the image point of the synthetic image has the same value as the addresses applied to the memories 21 . . . 24.

If a plurality of synthetic images are to be calculated, a further memory will be provided for each of these images and also a corresponding number of extreme-value decoders 60 whose inputs receive not only the output signal of the extreme value decoder 50, but also the signal read from the associated memory.

The described operation is then repeated for other points of the layer, x, y then being varied whilst n remains constant (step c)). Subsequently, the operation is repeated for the $m^{th}$ layer (taken from the first layer L4), n then assuming the value 1. However, in that case instead of the image values of image points which are stored at the same address, image values are processed of image points which have been shifted through three image points with respect to one another in the x and/or the y direction. In that case the address of the memory 70 is also varied, be it only so that the image value of an image point is addressed which has been shifted 1 position to the left with respect to the value fetched from the memory 21. After the layer characterized by $n=1$ has thus been processed, the method is repeated for further layers ($n=2, 3$), but also for layers having negative n-values (these layers are situated underneath the layer L4). Finally, a synthetic image or a plurality of synthetic images will be stored in the image memory 70.

The image memories 20 and 70 are coupled to a graphics processor 80 which treats the image values read from these image memories so that video images can be derived therefrom for display on the monitor 10 (see FIG. 1).

There are various possibilities of displaying the images so that the impression of space is obtained. When single images and synthetic images are successively displayed so that continuously other perspectives which adjoin previous perspectives of the examination zone occur, the impression of a rotating three-dimensional object can be created for the observer. However, it is alternatively possible to use the images for stereoscopic observation, where each time a single image and a synthetic image formed from a neighbouring position form a pair of stereo images. Such image pairs can be stereoscopically displayed, for example in that they are displayed on a display unit in a spatially separated manner and are observed through suitable eyeglasses, for example wedge eyeglasses (see DE-PS No. 21 57 843), or through polarization eyeglasses when intermediate polarization filters, are used. Another possibility consists in the display of one (or more) stereo image pairs on a colour monitor where, for example the single images are displayed in red and the synthetic images are displayed in green, the assembly being observed through red/green eyeglasses.

Figure 4:
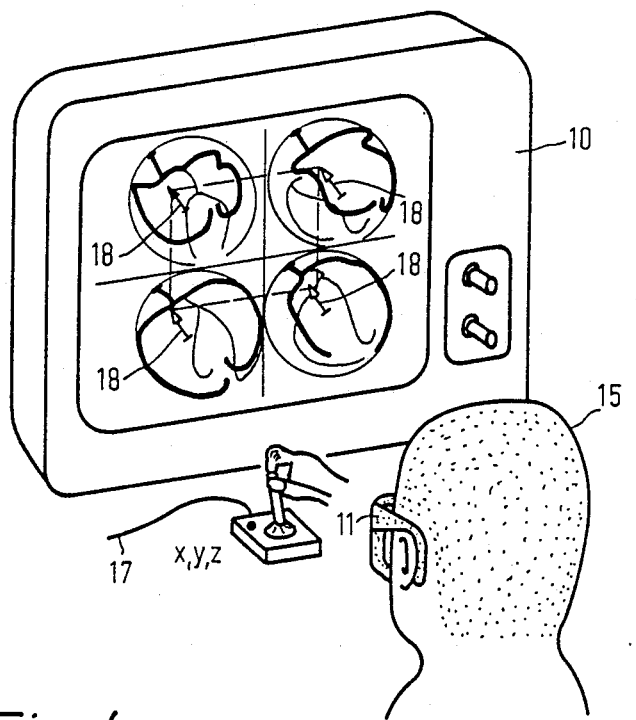
FIG. 4 shows an observation apparatus for observing stereo images.

This case is illustrated in FIG. 4 in which four stereo image pairs are displayed on the colour monitor 10, each time one pair being observed through red/green eyeglasses 16 by the observer 15. By activation of a digital coordinate generator 17, for example in the form of a so-called joystick, a mouse or a so-called track ball, the observer can position a cursor in the form of an arrow in each stereo image pair. This would already be possible in the case of display of only a single stereo image pair, but in that case the perspective could be so unfavourable that exact positioning is not possible. In the case of four stereo image pairs, however, there will usually be at least one pair enabling more accurate positioning. The distance between the cursor positions in the two images of a stereo image pair depends on how deep the area to be marked by the cursor is situated in the examination zone. Two positions can also be marked by cursors in each image and be interconnected in each image via a straight line. If desired, a machine (robot) or the like can also be controlled in accordance with the preset cursor position, for example for stereo taxy.

As appears from FIG. 3, the digital coordinate generator 17 is coupled to the control unit 30 which derives the values x, y, n therefrom for supply to the address generator 40 which forms therefrom the addresses of the image points in the single images and the synthetic images where the cursor is to be displayed. To this end, the memories 20 and 70 may comprise additional memories which comprise the same number of storage locations as the memories 20 and 70, but which have a smaller storage depth, for example each time one bit only; if a cursor is to appear at the relevant image point, the content of the storage location is set to "1", and otherwise it is "0" (or vice versa). The graphics processor 80 then produces the cursor in the desired shape at the relevant position in the single image or the synthetic images.

The storage of the cursor position, however, can also be realized without using additional memories when the entire storage depth is not used in the image memory. For example, in the case of an image memory having a word width of eight bits, only seven bits can be used for the image value and one bit for storing the cursor position.

The position of the cursor, and hence the position of the area marked thereby, can also be determined in a three-dimensional cartesian coordinate system (see FIG. 2) whose origin is situated, for example in the centre between the single images B1, B2 for display on the monitor. The control unit 30 is constructed so that it can also calculate the coordinates of a second cursor position, so that the distances between two areas which are marked by cursors in the stereo image pairs can be calculated, enabling accurate proportioning of the images.

Figure 5:
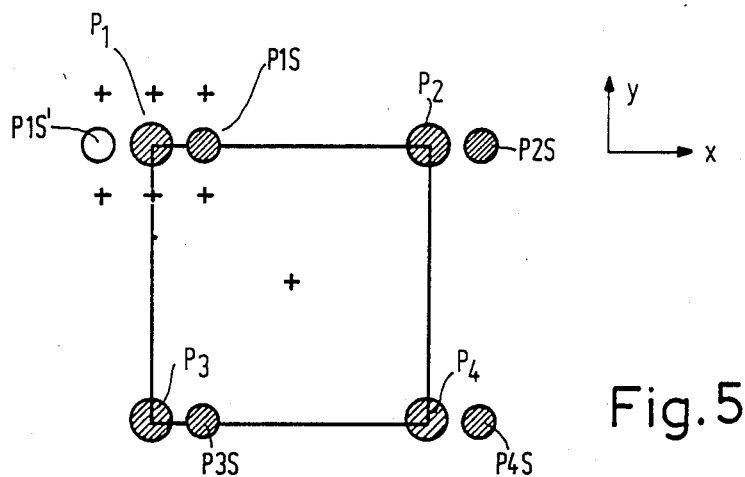
FIG. 5 shows the position in space of the radiation sources and the postions for which the synthetic images are calculated.

FIG. 5 shows positions for which synthetic single images can be calculated. The reference P1S denotes a position which corresponds to the position Ps indicated in FIG. 2. This position, however, can also be situated at the other side, adjacent the radiation source position P1 (P1S) or also between the radiation sources P1 and P3 or elsewhere. It is only important that the positions are situated on a straight connecting line between two radiation source positions and that their distance from one of these positions can be described by D/m, m being an integer number. FIG. 5 shows the positions P1s ... P4s (shaded) wherefrom four stereo image pairs can be derived. The positions P1S ... P4S for the synthetic images have been shifted over the same distance and in the same direction with respect to the neighbouring radiation source positions P1 ... P4.

Of the blocks shown in FIG. 3, the control unit 30 and possibly the address generator 40 can be realized by means of a microprocessor or microcomputer; the extreme value decoders 50 and 60 could also be realized thereby, but in that case only sequential image processing will be possible. In the case of 32-bit systems with clock frequencies of up to 25 MHz, however, the calculation times are comparatively short. In order to increase the processing speed, for each synthetic image there can be provided a processor which accesses the image memory 20, possibly via a multiplex system.

The invention has been described with reference to single images which represent the examination zone at a given instant. In the case of moving objects, for example the imaging of coronary vessels filled with a contrast medium, however, it may be attractive to process and display in this manner an entire sequence of single images formed at the same instant.

What is claimed is:

1. A method of generating an image for display of an object, having layer planes (L1 ... L7) of layer image points, in an examination zone (5) comprising:
    irradiating said examination zone with penetrating radiation from a plurality of spaced-apart actual radiation source positions (P1 ... P4);
    collecting and storing single image point data indicative of radiation exiting said examination zone for a plurality of single images (B1 ... B4), each due to a different actual radiation source position (P1 ... P4), said layer image points being positioned so that the layer image point values can be determined from said single image point data; and
    generating synthetic image point values for a synthetic image (Bs) of selected layer planes of said object as would be due to irradiation from a synthetic source position (Ps), which neighbors one (P1) of the actual source positions, said generating comprising: determining the contribution of said single image point data to each synthetic image point value.

2. The method as claimed in claim 1 wherein said determining comprises: first determining from the single image point data, the value at each layer image point; and second determining the contribution of the value at said each layer image point to the value of a synthetic image point corresponding to said each layer image point.

3. A method as claimed in claim 2 wherein said first determining step is preceded by the step of successively choosing layer planes from said selected layer planes and said first determining is for each layer image point in a chosen layer plane.

4. A method as claimed in claim 1 wherein said synthetic source position (Ps) is located on a connecting line between said one (P1) of said actual radiation source positions and another (P2) of said actual radiation source positions at the distance D/m from said one (P1) of said actual radiation source position, where m is an integer larger than 1 and D is the distance between said one (P1) and said another (P2) of said actual radiation source positions, and said selected layer planes are every $m^{th}$ of said layer planes.

5. A method as claimed in claim 2 wherein said synthetic source position (Ps) is located on a connecting line between said one (P1) of said actual radiation source positions and another (P2) of said actual radiation source positions at the distance D/m from said one (P1) of said actual radiation source positions, where m is an integer larger than 1 and D is the distance between said one (P1) and said another (P2) of said actual radiation source positions, and said selected layer planes are every $m^{th}$ of said layer planes.

6. A method as claimed in claim 1 wherein said synthetic source position (Ps) is located on a connecting line between said one (P1) of said actual radiation source positions and another (P2) of said actual source positions, said selected layers being chosen so that layer image points lie at the intersection of three sets of lines: first lines directed from said one (P1) of said source positions to the single image points (b11 ... b14) due to said one source position (P1); second lines directed from said another (P2) of said source positions to the single image points (b21 ... b24) due to said another source position (P2); and third directed from said synthetic source position to the synthetic image points (b51 ... b54) in said synthetic image (B1).

7. A method as claimed in claim 2 wherein said synthetic source position (Ps) is located on a connecting line between said one (P1) of said actual radiation source positions and another (P2) of said actual source positions, said selected layers being chosen so that layer image points lie at the intersection of three sets of lines: first lines directed from said one (P1) of said source positions to the single image points (b11 ... b14) due to said one source position (P1); second lines directed from said another (P2) of said source positions to the single image points (b21 ... b24) due to said another source position (P2); and third lines directed from said synthetic source position to the synthetic image points (b51 ... b54) in said synthetic image (B1).

8. The method as claimed in claim 1 further comprising: displaying said synthetic image (Bs) and said single image (B1) due to said one (P1) of said source positions on a stereo display device (10) as a stereo pair.

9. A method as claimed in claim 1 wherein said synthetic image is a first synthetic image as would be due to irradiation from a first synthetic source position, a first displaying said first synthetic image and single image due to said one of said source positions as a first stereo pair and further comprising generating second synthetic image point values for a second synthetic image of selected layer planes of said object as would be viewed from a second synthetic source position which neighbors a different one of the actual source positions, and
    second displaying said second synthetic image and the single image due to said different one of the actual source positions on said stereo display device as a second stereo pair.

10. A method as claimed in claim 8 wherein said first displaying and said second displaying are performed successively.

11. A method as claimed in claim 2, wherein said second determining further comprises setting each synthetic image point value equal to the layer image point contribution to said synthetic image point value corresponding to the maximum radiation absorption.

12. The method of claim 1 further comprising:
displaying said synthetic image and marking the location of points of interest in said displayed synthetic image, utilizing operator coodinate input means.

13. A method as claimed in claim 14, wherein said object undergoes a dynamic process, and further comprising recording sequential synthetic images (Bs) and single images (B1) due to said one of said source positions, for producing a stereo cine of said dynamic process.

14. A method as claimed in claim 1, further comprising utilizing said synthetic image values to control a machine operating upon said object.

15. A device for generating an image of an object having layer planes (L1 ... L7) of layer image points in an examination zone (5) comprising:
source means for irradiating said examination zone with penetrating radiation from a plurality of spaced-apart actual source positions (P1 ... P4);
means (6, 7, 8) for measuring single image point data for a plurality of separate single images of said examination zone due to irradiation from said respective actual source positions;
first storage means (10) for storing the single image point data for said plurality of separate single images; and
means for generating from said stored single image point data, synthetic image point values for a synthetic image (Bs) of selected layer planes of said object as would be due to irradiation from a synthetic source position (Ps) which neighbors a selected one of the actual source positions, said generating means comprising:
means for determining the contribution of said single image point data of said plurality of separate single images to each synthetic image point value; and
display means (10) for displaying said synthetic image.

16. The device of claim 15 wherein said means for determining comprises first means for determining the value at each layer image point from the single image point data; and second means for determining the contribution of the value at said each layer image point to a corresponding synthetic image point.

17. The device as claimed in claim 16 further comprising:
means for sequentially choosing layer planes from said selected layer planes; and
wherein said first determining means determines the value at each layer image point in a chosen layer plane.

18. The device as claimed in claim 16 wherein said first determining means comprises means for selecting that single image point corresponding to said layer image point which produces a value representing the minimum radiation absorption at said layer image point.

19. A device as claimed in claim 16 wherein said second determining means comprises means for selecting that layer image point value which produces a value of a synthetic image point corresponding to said layer image point representing the maximum radiation absorption at said synthetic image point.

20. A device as claimed in claim 15 further comprising operator control means (17) for inputting coordinates and arithmetic means responsive to said operator control means for positioning a mark in the displayed synthetic image.

21. The device of claim 15 wherein said display means comprises means for displaying as a stereo pair both said synthetic image and the single image due to irradiation from said selected one of said source positions.

* * * * *